United States Patent [19]

Nakanishi et al.

[11] 4,158,435

[45] Jun. 19, 1979

[54] METHOD AND APPARATUS FOR READING LABEL BAR CODES

[75] Inventors: Sadao Nakanishi; Kazuhiro Suzuki; Nobufumi Tokura; Shinichiro Endo, all of Ise, Japan

[73] Assignee: Shinko Electric Co., Ltd., Tokyo, Japan

[21] Appl. No.: 895,032

[22] Filed: Apr. 10, 1978

[30] Foreign Application Priority Data

Apr. 14, 1977 [JP] Japan .................................. 52/44002

[51] Int. Cl.² .......................... G06K 7/10; G08C 9/06; G11B 5/09
[52] U.S. Cl. .................................... 235/463; 250/555; 360/40
[58] Field of Search ....................... 235/463, 449, 462; 360/40; 250/555

[56] References Cited

U.S. PATENT DOCUMENTS

| | | | |
|---|---|---|---|
| 3,868,634 | 2/1975 | Dolch | 235/462 |
| 3,902,049 | 8/1975 | Hanchett, Jr. | 235/462 |
| 4,000,397 | 12/1976 | Hebert et al. | 235/462 |
| 4,091,379 | 5/1978 | Wu et al. | 235/462 |
| 4,096,992 | 6/1978 | Nojiri et al. | 235/462 |

*Primary Examiner*—Daryl W. Cook
*Attorney, Agent, or Firm*—Lane, Aitken & Ziems

[57] ABSTRACT

A method and apparatus for reading label bar codes in which a photoelectric signal representative of an optically scanned bar code label is differentiated. The positive and negative peaks of the differentiated signal are detected, and the time intervals between the peaks are measured by counter means to produce output signals representative of the bar code label. A multi-level threshold comparison technique is used to detect and predict the occurrence of positive and negative peaks.

12 Claims, 4 Drawing Figures

FIG. 4

| (−) THRESHOLD LEVELS \ (+) THRESHOLD LEVELS | '1' | '2' | '3' | '4' | '5' | '6' | '7' | '8' |
|---|---|---|---|---|---|---|---|---|
| '1' | ⊓ |   |   |   |   |   |   |   |
| '2' | ⊓ | ⊓ |   |   |   |   |   |   |
| '3' | ⊓ | ⊓ | ⊓ |   |   |   |   |   |
| '4' | × | ⊓ | ⊓ | ○ |   |   |   |   |
| '5' | × | ⊓ | ⊓ | ○ | ○ |   |   |   |
| '6' | × | ⊓ | ⊓ | ○ | ○ | ○ |   |   |
| '7' | × | ⊓ | ⊓ | ○ | ○ | ○ | ○ |   |
| '8' | × | × | ⊓ | ○ | ○ | ○ | ○ | ○ |

METHOD AND APPARATUS FOR READING LABEL BAR CODES

BACKGROUND OF THE INVENTION

The present invention relates to label readers, and more particularly, to a method and a label reader apparatus for reading bar code labels. Recently, computer based systems for inventory control have seen widespread use in supermarkets, department stores, warehouses, and the like. The successful operation of these computerized inventory systems is dependent, typically, upon the ability of certain peripheral equipment known as label readers to reliably read data encoded into the labels associated with the inventory goods and to then provide correct data to the central computer.

Typical label codes associated with inventory items include so-called bar codes consisting of a plurality of bars of different widths or colors. The arrangements of the bars in such a code can be interpreted by the central computer, based upon the data provided by the label reader, to identify the particular inventory goods involved. Such bar codes are usually printed on price tags or other labels associated with the inventory items.

Conventional label readers generally use optical means to optically scan bar code labels. Such optical means typically includes a photoelectric converter means such as a photomultiplier tube which produces output signals representative of the bars comprising the scanned bar code label. The output signals from such photoelectric converts typically include noise signals arising, for example, from "shading", glittering or undulation of the label surface, and interfering light from external light sources, and light diffused from external objects located nearby. Also, the output signals from such devices normally suffer from amplitude variations as the distance between the light receiving surface of the detecting means and the label surface varies. Additionally, often the diameter of the ray from the laser or other light beam source used to scan a bar code is significant relative to a typical bar width in a bar code label. When this situation exists, the output signal from the photoelectric converter may inherently include a minimum level between the two extreme levels corresponding to pure black and white colors on a label surface.

Another consideration is that conventional wave shaping or normalizing is often employed in the process of extracting the bar width information from the output signals from a photoelectric converter. Often, for example, automatic gain control (AGC) is applied to maintain a constant average output level from an amplifier having an average input level which varies with time. With such a system, when the output signal from the photoelectric converter changes abruptly or randomly due to undulations on a label surface, a AGC amplifier approach may be partially or completely ineffective. This can occur, for example, because the output signal from the photoelectric converter will vary as a function of the distance between the light receiving surface of the photoelectric converter and the label surface, or with noise resulting from external sources or conditions.

Also, in many conventional label readers, the output signal from the photoelectric converter is first differentiated and then filtered through a high pass filter to remove the high frequency noise components therefrom and to smooth the signal to facilitate subsequent detection of the points corresponding to black-to-white transitions and vice versa corresponding to the successive bars and spaces in a bar code. Signals shaped using these conventional techniques, however, may have unstable amplitudes thereby creating other difficulties.

Still other difficulties are encountered in systems in which the output signal from the photoelectric converter is compared with only a single threshold level. In such systems, only signals exceeding the threshold level are detected and converted into rectangular output pulses, and therefore, if an input signal to the threshold detector fails to reach the threshold level, a bar (or space) of a bar code may be omitted or not detected, even though consideration of the overall waveform would indicate that a bar (or space) has just been read.

SUMMARY OF THE INVENTION

Accordingly, an object of the present invention is to provide a method and a label reader apparatus for reading bar code labels such that the bar width information in a bar code label may be correctly read even if there are considerable amplitude variations in the output signal from the photoelectric converter, and even if there are considerable noise components in the output signal due to glittering and/or undulation of the label surface.

According to the present invention the output signal from the photoelectric converter is first differentiated to produce a differentiated signal representative of the scanned bar code. Next, appropriate means are employed to detect the positive and negative peaks of the differentiated signal. Counter means and next employed to measure the interval of time between the positive and negative peaks of the differentiated signal to provide the bar width output signals.

Other objects and advantages of the method and apparatus of the present invention will be apparent from the following description taken in conjunction with the accompanying drawings.

BRIEF DESCRIPTION OF THE DRAWINGS

FIG. 4 is a table useful in describing the operation of the multi-level threshold comparison apparatus included in the apparatus of FIGS. 1 and 2.

DESCRIPTION OF THE PREFERRED EMBODIMENT

Figure 1:
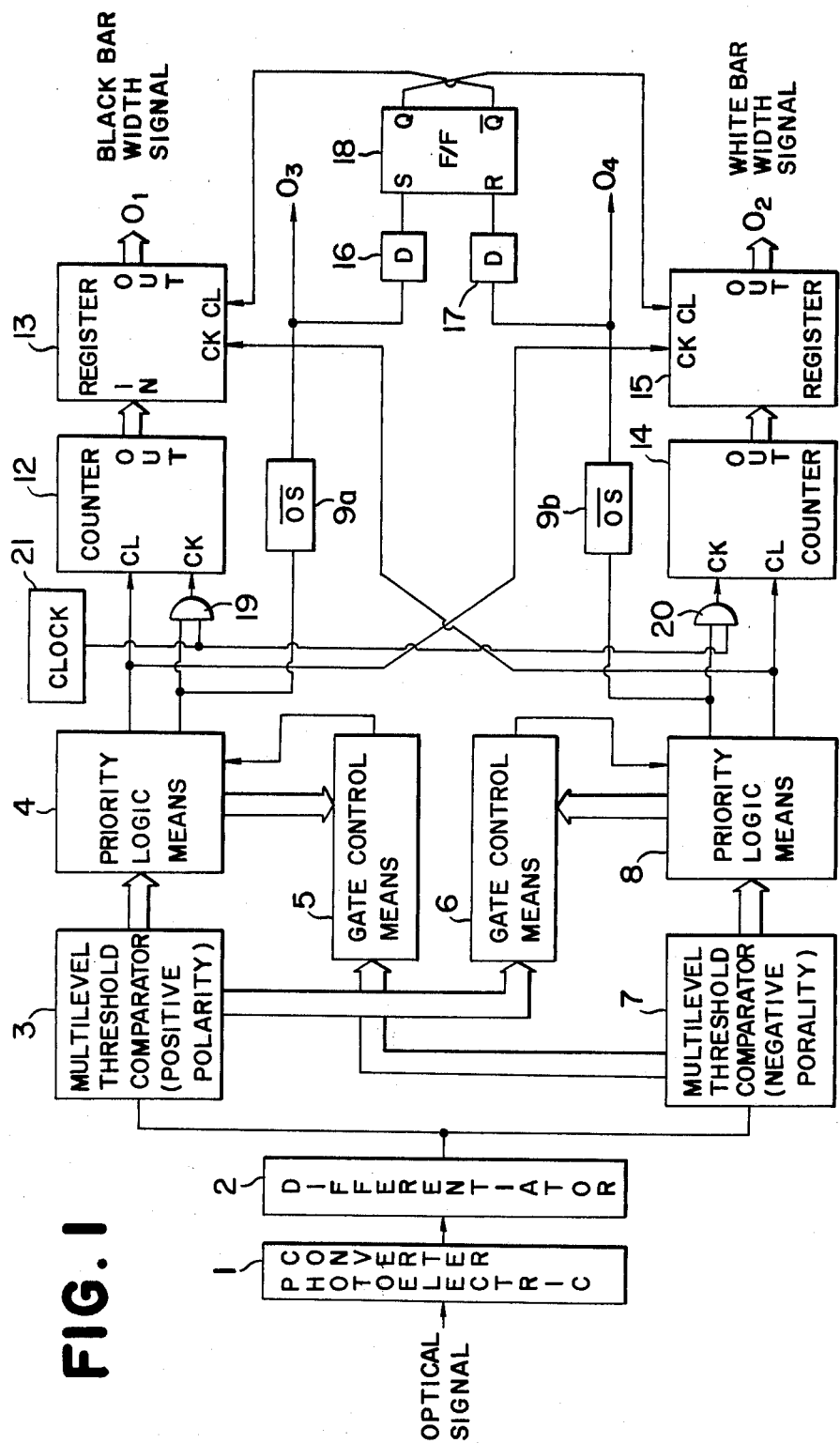
FIG. 1 is a block diagram showing a label reader apparatus for reading a bar code label according to the method of the present invention.

Referring now to FIG. 1, an optical signal is provided to a photoelectric converter 1 having its output connected to the input of a differentiator 2. The output signals from the photoelectric converter 1 are representative of optically scanned bar code label information. The output of the differentiator circuit 2 is connected to both the inputs of a comparator circuit 3 and a comparator circuit 7. The comparator circuit 3 includes multi-level threshold comparison means with the thresholds being selected to provide comparisons for the positive polarity portions of the differentiated signal at the output of the differentiator 2. Similarly, the comparator 7, also includes multi-level threshold comparison means with the thresholds selected to provide comparisons for the negative polarity portions of the differentiated signal.

One output from the comparator 3, including all of the comparison output signals therefrom, is connected to the input of a priority logic means 4. A first output from the logic means 4 is connected to the clear terminal "Cl" input of a counter 12 and also to the Ck input of a register 15. A second output from the logic means 4 is connected to the clock terminal "CK" of the same counter 12 through and AND gate 19. The contents of the counter 12 are adapted to be read out over an output signal line into a register 13 to produce an output signal therefrom on a signal line $O_1$, the output signal being representative of the width of a black bar of a bar code label.

Similarly, one output from the comparator 7, including all of the comparison output signals therefrom, is connected to the input of a second priority logic means 8. A first output from the logic means 8 is connected to the clear terminal "CL" input of a second counter 14 and also to the CK input of the register 13. A second output from the logic means 8 is connected to the clock input terminal "CK" of the counter 14 through an AND gate 20. The contents of the counter 14 are adapted to be read out into the register 15 to produce an output signal therefrom on a signal line $O_2$, the output signal being representative of the width of a white bar of a bar code label.

A first gate control means 5 is provided with two inputs, the first being connected to a control output signal from the logic means 4, and the other being connected to an output from the comparator 7. The output of the first gate control means 5 is connected to an input to the logic means 4. Similarly, a second gate control means 6 has two inputs, the first being connected to an output from the logic means 8, and the second being connected to an output from the comparator 3. Similarly the gate control means 6 provides its output signal as an input signal to the logic means 8.

A clock pulse or a timing generator 21 provides clock pulses to one input of the AND gate 19 and to one input of the AND gate 20.

The output of the logic means 4 connected to the AND gate 19 is also connected to a one-shot multivibrator 9a to produce a black strobe signal on the signal line $O_3$ at the output of the one-shot 9a. Similarly, the output of the logic circuit 8 connected to the input to the AND gate 20 is also connected to a one-shot multivibrator 9b to produce a white strobe signal on the signal line $O_4$ at the output of the multivibrator 9b. The output of the one-shot multivibrator 9a is also connected to a delay element 16 which, in turn, is connected to the SET terminal of a set-reset flip-flop 18. Simiarly the output of the one-shot multivibrator 9b is also connected to a delay element 17, the output of which is connected to the RESET terminal of the same flip-flop 18. The Q output from the flip-flop 18 in turn is connected to the clear "CL" terminal input of the register 15, and the $\bar{Q}$ is connected to the clear "CL" terminal input of the register 13.

Figure 2:
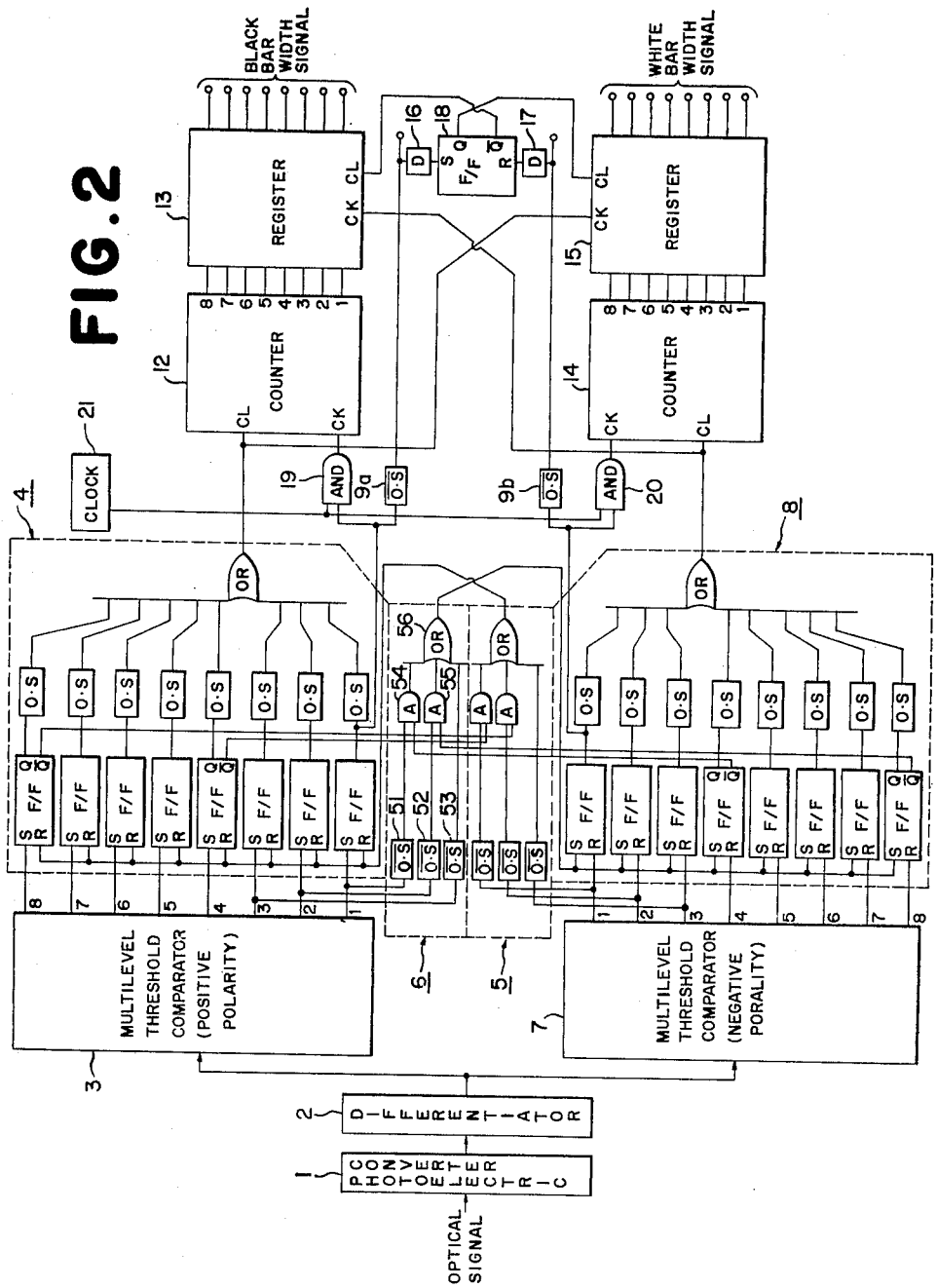
FIG. 2 is a circuit diagram, partially in block form, showing further details of the apparatus of FIG. 1.

FIG. 2 discloses further circuit details of the apparatus of FIG. 1, particularly with regard to the priority logic means 4 and 8, and the first and second gate control means 5 and 6. Because each of the priority logic means 4 and 8 are identical logically as are each of the gate control means 5 and 6, only one of each will be described in detail. The priority logic means 4 includes therein an eight input OR gate, each of the inputs thereto being connected to the output of one of eight one-shot multivibrators, the inputs to which are in turn, connected to the Q outputs of one of eight set-reset RS flip-flops F/F as shown. The output from the OR gate is adapted to be connected to the CL input of the counter 12. The set or "S" inputs of the eight set-reset flip-flops F/F in the priority logic means 4 are connected to one each of the respective output signal lines 1, 2. . . 8 of the comparator 3. These signal lines are ordered according to the magnitude of the threshold comparison level involved. The reset "R" inputs of the eight flip-flops in the logic means 4 are connected together and connected to the output signal from the gate control means 5. With this arrangement, each one-shot multivibrator OS is triggered to provide an output pulse therefrom upon receipt of the leading edge of the signal transition at the output of the respective flip-flop F/F, and the outputs of the eight one-shot multivibrators OS are logically added by the OR gate.

As further shown in FIG. 2, the gate control means 5 and 6 each include three one-shot multivibrators, two dual input AND gates, and one three input OR gate. The one-shot multivibrators in the gate control means 5 and 6, however, are selected to trigger on the trailing edges of the input signals applied thereto. As shown in FIG. 2, the first three comparator threshold level output signals from the comparator 3 are applied respectively as input signals to the one-shot multivibrators 51, 52, and 53 in the gate control means 6. The output signal from the one-shot 51 is connected as one input to the AND gate 54, and the output signal from the one-shot 52 is connected as one input to the AND gate 55. The two other inputs of the AND gates 54 and 55 are connected, respectively, to the $\bar{Q}$ outputs of the set-reset flip-flops 4 and 8 of the logic means 8. The outputs from the two AND gates 54 and 55 are connected as two of the inputs to the OR gate 56, the other input of which is connected to the output from the one-shot multivibrator 53. The output of the OR gate 56 is connected to the reset line of the set-reset flip-flops F/F in the logic means 8 as previously described. Similarly, the gate control means 5 includes the same logic elements but is connected to the other comparator, and the other logic means, and its output controls the reset of the eight flip-flops in the logic means 4.

With this apparatus it is seen that the differentiated signal at the output of the differentiator 2 includes positive and negative polarity components which are processed by the multi-level threshold comparator 3 and the multi-level threshold comparator 7. The comparator 3 compares the positive component of the input signal thereto with predetermined multi-level threshold levels therein to produce pulse output signals on lines 1, 2, ... 8 depending upon the results of the comparison at a given instant. The comparator 7 performs a similar function for the negative component of the differentiated signal provided at its input. The numbered output lines from each of the comparators 3 and 7 are numbered according to an increasing magnitude of the corresponding threshold or comparison level.

The use of these multi-level threshold comparators 3 and 7 is important to the operation of this apparatus according to the method of the present invention in that all input differentiated signals exceeding the first threshold level (i.e. level 1) are detected. This arrangement avoids certain difficulties experienced with conventional single level threshold techniques, for example, because an appropriately selected value for the first threshold level will minimize the likelihood that a proper signal is not detected. Also, the multi-level threshold comparison approach provided by the comparators 3 and 7 permits a prediction technique to be implemented in cooperation with the logic means 4 and 8 and the gate control means 5 and 6 as will be further described.

Figure 3:
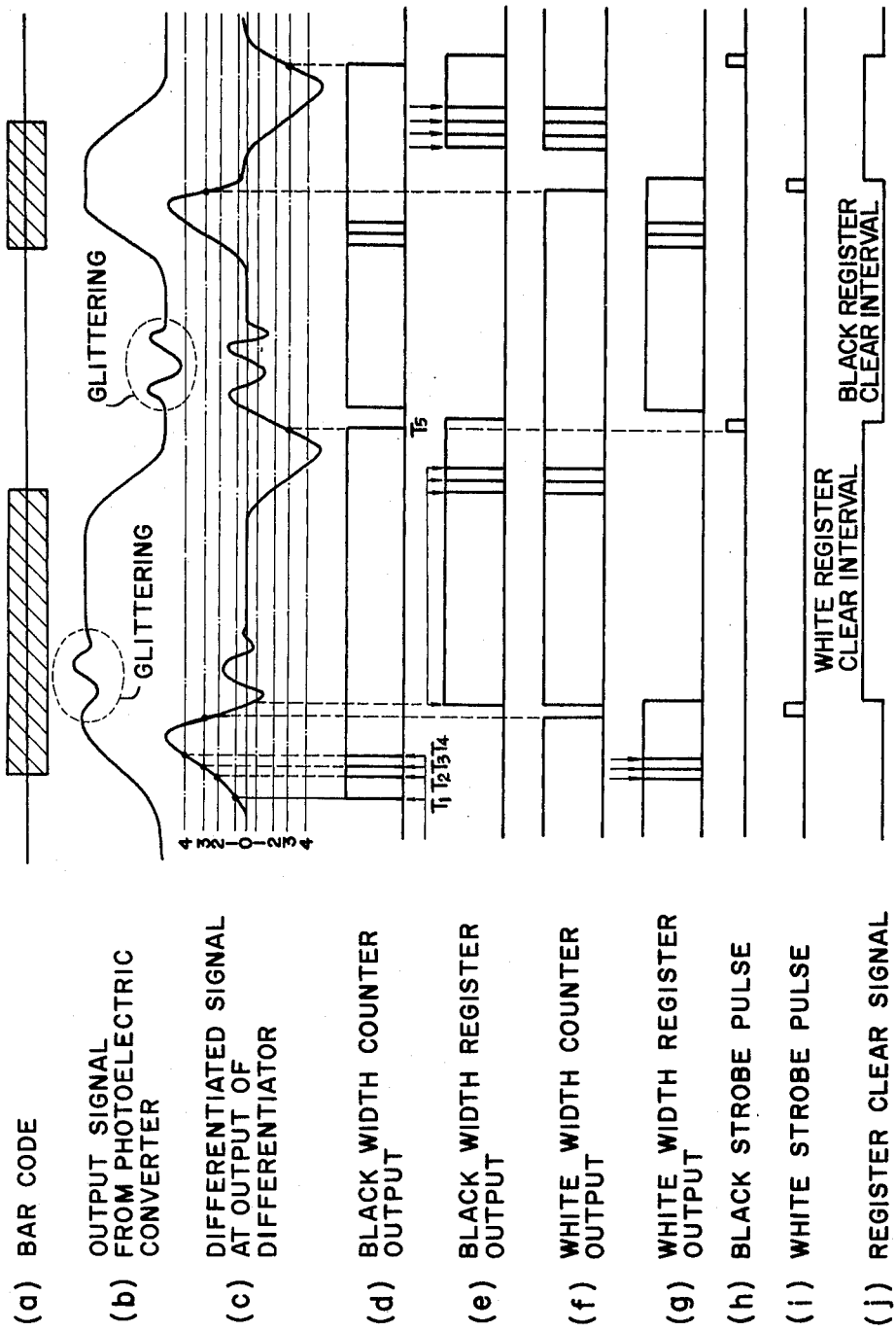
FIG. 3, consisting of a through j, is a timing and signal diagram useful in describing the operation of the apparatus of FIGS. 1 and 2.

FIG. 3 is a signal and timing diagram useful in explaining the operation of the apparatus of FIGS. 1 and 2 according to the method of the present invention. Line (a) in FIG. 3 illustrates a portion of a bar code label which, for purposes of discussion, may be considered as being optically scanned from left to right in the direction of the arrow. Line (b) illustrates a typical output signal from the photoelectric converter 1 based upon the optical scanning of the label of Line (a). The typical effect of label "glittering" is also shown on the signal in Line (b).

The signal shown on Line (c) is the differentiated signal at the output of the differentiator 2 when the signal of Line (b) is applied to the input of the differentiator. Superimposed on the differentiated signal of Line (c) is a "O" line and eight other lines parallel thereto. The four numbered lines above the "O" line correspond to the first four threshold levels in the comparator 3, and the four numbered lines below the "O" line correspond to the first four threshold levels in the comparator 7.

Line (d) of FIG. 3 corresponds to the counting operation of the counter 12 based on the differentiated signal of Line (c). It is seen that the counter commences its counting operation at time $T_1$ when the first threshold level in comparator 3 is first exceeded. However, the counting operation is then cleared by a succession of clear pulses until time $T_4$. In effect, then, the system detects the peak of the differentiated signal and the counter counts without being immediately cleared or reset. As will be further explained, the counting operation of the counter 12 continues, preferably for a period of time sufficient to accumulate a count corresponding to or representative of a measure of the width of the black bar of the bar code. In a preferred embodiment the clock period of the clock 21 is appropriately selected so that the counter 12 accumulates a count based on number of clock pulse provided through the AND gate 19 to its "CK" input during the period of time when the AND gate 19 is enabled. In the example of FIG. 3, this counting will continue until time $T_5$ when the gate control means 5 produces a reset signal for the logic means 4 which, in turn, cause the AND gate 19 to be disabled so that the counting operation of the counter 12 ceases.

During the period of the above described counting operation of the counter 12, the logic means 8 generated signals at $T_7$, $T_8$, etc. which were applied to the "CK" input of the register 13 to cause the contents of the counter 12 to be loaded into the register 13 as shown by Line (e). In the example of FIG. 3, the contents of the counter 12 corresponding to the first black bar of Line (a) loaded in the register 13 at time $T_9$ is the final measure of the width of the black bar even though, as already noted, the counter 12 continues to count clock pulses until the later time $T_5$.

The gate-off signal occurring at time $T_5$ causes the one-shot 9a to be triggered to produce a black stobe output pulse signal (see Line (h) in FIG. 3) on signal line $O_3$ beginning at time $T_5$. This strobe pulse signal is used by means (not shown) to control the read-out of the black bar width signal over signal line $O_1$ from the register 13. The black strobe signal on the signal line $O_3$ is also applied through the delay element 16 to the register clear set-reset flip-flop 18. The purpose of the delay element 16 is to assure that there is sufficient time for the signal on signal line $O_1$ to read by the external means (not shown) before the register 13 is cleared by the register clear signal of Line (j) in FIG. 3. It is seen from the signal represented by Line (j) that one or the other of the registers 13 and 15 is always cleared, and that in this example, the black register (i.e. register 13) is not cleared until a predetermined interval of time after time $T_5$.

In view of the foregoing discussion, the significance of the Lines (f), (g) and (i) in FIG. 3 should be apparent for this example. The signals on those lines correspond to the white bar signals for the white width counter 14, the white width register 15, and the white strobe pulse on signal line $O_4$. Due to the basic symmetry in the operation of the apparatus of FIGS. 1 and 2, the signals represented by these lines in FIG. 3 will not be further explained.

FIG. 4 is a table which summarizes the gate-off pulse operation of gate control means 5 in cooperation with the logic means 4 and the comparators 3 and 7, for example, at time $T_5$ in FIG. 3. In FIG. 4 the symbol "X" indicates that no gate-off or output reset pulse is produced by control means 5. The symbol "⎍", on the other hand, indicates that a gate-off or reset pulse is produced, thereby causing the AND gate 19 to be disabled. To appreciate the information in FIG. 4, it should be assumed that a particular (+) threshold level has already been achieved by the input signal to the comparator 3. The entries in the table then indicate the output operation of the control means 5 based upon the subsequent attainment of a particular negative (−) threshold level. The symbol "O" in the table indicates the imbalance of lack of symmetry in the differentiated signal is less than a factor of two for equally spaced threshold levels in comparators 3 and 7. Of course, a gate-off pulse will always have been produced before any "O" state is reached.

It should be noted that operation of the apparatus of FIGS. 1 and 2, including the operation of the gate control means 5 as explained by the table in FIG. 4, embodies a prediction technique based on assumptions about the probable signal-to-noise ratio at the output of the photoelectric converter 1 and the differentiator 2, and the degree of imbalance or lack of symmetry in the differentiated signal. The predictive nature of this method and apparatus may be seen, for example, from the fact that a gate-off or reset pulse is always produced before any "O" state is ever reached. It is also seen from the "X" states in the table that, a negative signal following a positive signal is regarded as noise unless it satisfies a predetermined 4:1 signal-to-noise ratio criterion.

Accordingly it is seen that the method and apparatus of the present invention achieves the objects of the invention. While a preferred embodiment has been described, other variations will be apparent to those skilled in the art without departing from the principles of the invention and within the scope of the invention as set forth in the appended claims.

What is claimed is:

1. A method for reading a bar code label comprising the steps of:
   differentiating a photoelectric signal representative of the bar code information;
   detecting the positive and negative peaks of the differentiated signal; and determining the time interval between the positive and negative peaks of the differentiated signal.

2. A method according to claim 1 wherein a peak of one polarity of the differentiated signal is detected by comparing the differentiated signal with a plurality of threshold levels and a peak of the other polarity is detected by using a prediction technique.

3. A method according to claim 2 wherein, in the step of determining the time interval, counting is performed such that when a positive portion of the differentiated signal coincides with a more positive threshold level, a counter is cleared and when a negative portion of the differentiated signal coincides with a more negative threshold level, the count is registered.

4. A label reader apparatus for reading a bar code label comprising:
    a differentiator for differentiating a photoelectric signal representative of the bar code information;
    means for detecting the positive and negative peaks of the differentiated signal; and
    means for determining the time interval between the positive and negative peaks of the differentiated signal.

5. A label reader apparatus according to claim 4 wherein said detecting means comprises comparison means for comparing the differentiated signal with a plurality of threshold levels and a prediction means for predicting the subsequent occurrence of a peak based upon the differentiated signal satisfying predetermined signal-to-noise and signal peak imbalanced criteria.

6. A label reader apparatus according to claim 5 wherein said determining means comprises counter means and register means for registering the contents of said counter means.

7. A label reader apparatus according to claim 6 wherein said determining means further comprises logic means such that when a positive portion of the differentiated signal coincides with a more positive threshold level, said counter means is cleared, and when a negative portion of the differentiated signal coincides with a more negative threshold, the contents of said counter means is loaded into said register means.

8. A label reader apparatus for reading a bar code label comprising:
    a differentiator for differentiating a photoelectric signal representative of bar code information;
    a first detecting means for detecting the positive peaks of the differentiated signal;
    a second detecting means for detecting the negative peak of the differentiated signal;
    a first counter adapted to commence its counting operation when said first detecting means detects a positive peak,
    a second counter adapted to commence its counting operation when said second detecting means detects a negative peak;
    a first stopping means for stopping the counting operation of said first counter;
    a second stopping means for stopping the counting operation of said second counter;
    a first register for registering the contents of said first counter; and
    a second register for registering the contents of said second counter.

9. A label reader apparatus according to claim 8 wherein said first and second detecting means each include comparison means for comparing the differentiated signal with a plurality of threshold levels.

10. A label reader apparatus according to claim 9 wherein each of said first and second counters, is adapted to commence its counting operation when said corresponding detecting means detects the coincidence of the differentiated signal with the lowest magnitude threshold level in said corresponding detecting means.

11. A label reader apparatus according to claim 8 wherein said first and second stopping means cause said corresponding counter to stop its counting operation at a time predicted based upon the differentiated signal satisfying predetermined signal-to-noise and signal peak imbalance criteria.

12. A label reader apparatus according to claim 8 wherein each of said first and second registers initiates its receiving of the contents of said corresponding counter when said opposite detecting means detects the coincidence therein of the differentiated signal with the lowest magnitude threshold level therein, and is adapted to receive the contents of said corresponding counter each time said opposite detecting means detects the coincidence therein of the differentiated signal with a higher magnitude threshold level therein, and is adapted to clear its receiving operation after a predetermined time delay after said corresponding counter clears its counting operation.

* * * * *